(12) United States Patent
Katou et al.

(10) Patent No.: US 7,480,108 B2
(45) Date of Patent: Jan. 20, 2009

(54) LENS ACTUATOR AND OPTICAL PICKUP

(75) Inventors: Seiichi Katou, Tsuchiura (JP); Hidenao Saito, Yokohama (JP); Akio Yabe, Fujisawa (JP); Yasushi Kinoshita, Hitachinaka (JP)

(73) Assignee: Hitachi Media Electronics Co., Ltd., Oshu-shi (JP)

( * ) Notice: Subject to any disclaimer, the term of this patent is extended or adjusted under 35 U.S.C. 154(b) by 186 days.

(21) Appl. No.: 11/668,058

(22) Filed: Jan. 29, 2007

(65) Prior Publication Data

US 2008/0106810 A1   May 8, 2008

(30) Foreign Application Priority Data

Aug. 30, 2006   (JP) .............................. 2006-232982

(51) Int. Cl.
*G02B 27/00* (2006.01)
(52) U.S. Cl. .................. 359/811; 359/813; 359/819
(58) Field of Classification Search .................. 359/811, 359/813, 819
See application file for complete search history.

(56) References Cited

U.S. PATENT DOCUMENTS

2008/0175129 A1 * 7/2008 Tanaka et al. .......... 369/112.23

FOREIGN PATENT DOCUMENTS

JP   10-340474   12/1998

\* cited by examiner

*Primary Examiner*—Jordan M. Schwartz
*Assistant Examiner*—James C Jones
(74) *Attorney, Agent, or Firm*—Antonelli, Terry, Stout & Kraus, LLP.

(57) ABSTRACT

In a lens actuator on which a first lens and a second lens are mounted, since the first lens and the second lens are disposed side by side, a problem is involved such that the lens actuator is bulky. The present invention provides a lens actuator comprising a first lens and a second lens having different optical paths, disposed between a light emitting element and an object lens, a holder for holding the first lens and second lens such that the optical axes of the first lens and second lens are parallel to each other, and a driving mechanism for driving the first lens and second lens each in the optical axis directions, wherein the first lens and second lens have respective outer periphery parts respectively outside the effective diameter, and the outer periphery parts of the first lens and the second lens are disposed to be partially overlapped with each other when viewed from the first lens and second lens optical axis direction.

6 Claims, 6 Drawing Sheets

LENS ACTUATOR AND OPTICAL PICKUP

BACKGROUND OF THE INVENTION

1. Field of the Invention

The present invention relates to a lens actuator in an optical disc device for reading out the information recorded on the recording surface of an optical disc or recording the information, and it further relates to an optical pickup comprising the same.

2. Description of the Related Art

Since an optical disc device for recording information on a disc-like recording medium or reading out and replaying the recorded information enables recording a relatively large amount of information on the disc, and furthermore, the disc has a high stiffness and is easy to handle, it is used as an external recording device for a computer, or a video or audio recording device.

In such an optical disc device, a mechanism for driving a lens for converging or diverging a light beam from a light emitting element in the optical axis direction is a lens actuator. In general, the lens actuator comprises a movable part including a lens and a holder for holding the lens, a supporting member for supporting the movable part, and a driving part such as a motor. By applying a driving current to the driving part such as a motor, the movable part is driven. In the lens actuator, there is also a device for correcting the thickness irregularity of the transparent protective layer of an optical disc or the spherical aberration generated by traveling between the recording layers of a multiple layer recording disc. Recently, the density of optical disc has become higher and as a way to achieve it, mainly, the wavelength of the laser as light emitting element is shortened or the aperture of the object lens is enlarged. In the high density optical disc, since the above-mentioned spherical aberration deteriorates a recording or replaying signal, a device for correcting the spherical aberration is necessary. Moreover, among the high density optical discs, there are optical discs different in thickness of transparent protective layer for the same laser wavelength. For example, there are those having protective layer thicknesses of 0.6 mm and 0.1 mm and therefore, in order to correct the spherical aberration, a first lens and a second lens having different characteristics are needed.

As a lens actuator having a first lens and a second lens, there is an object lens actuator as shown in Japanese Patent Application Laid-Open No. 10-340474 (pages 3-4, FIG. 1), with the first lens and the second lens disposed side by side.

In the above-mentioned conventional technique, since the first lens and the second lens are disposed side by side, a problem is involved such that the lens actuator is bulky. Moreover, the lens has a circular ring-like portion provided on the outside of the effective diameter for the use of molding the lens. Therefore, the lens diameter is enlarged so that the lens actuator becomes further bulky, and thus it is problematic.

SUMMARY OF THE INVENTION

The present invention has been achieved in view of the above-mentioned problems, and an object thereof is to provide a small size lens actuator.

In order to achieve the above-mentioned object, the present invention provides the following configuration.

The present invention provides a lens actuator comprising a first lens and a second lens having different optical paths, disposed between a light emitting element and an object lens, a holder for holding the first lens and second lens such that the optical axes of the first lens and second lens are substantially parallel with each other, and a driving mechanism for driving the first lens and second lens each in the optical axis directions, wherein each of the first lens and second lens has an outer periphery part outside the effective diameter, and the outer periphery parts of the first lens and the second lens are disposed to be partially overlapped with each other when viewed from the first lens and second lens optical axis direction.

Moreover, the present invention provides a lens actuator, wherein the surfaces on the holder for mounting the first lens and the second lens are so disposed that one of the surfaces is displaced from the other in the optical axis direction, in the lens actuator.

Furthermore, according to the present invention, in the lens actuator, the holder has the mounting surface for the first lens on the light emitting element side, and the mounting surface for the second lens on the object lens side.

Moreover, the present invention provides a lens actuator, further comprising a first guide shaft and a second guide shaft for supporting the holder such that the line connecting between the center of the first guide shaft and the center of the second guide shaft is substantially perpendicular to the line connecting between the center of the first lens and the center of the second lens, and that it passes through between the center of the first lens and the center of the second lens, in the lens actuator.

Furthermore, the present invention provides an optical pickup comprising a light emitting element, first and second object lens, a first lens disposed on a first optical path provided between the light emitting element and the first object lens, a second lens disposed on a second optical path provided between the light emitting element and the second object lens, and a lens actuator for moving the first lens and second lens simultaneously in the optical axis direction, wherein each of the first lens and second lens has an outer periphery part outside the effective diameter, the optical axes of the first lens and second lens are substantially parallel to each other, and the outer periphery parts of the first lens and the second lens are disposed to be partially overlapped with each other when viewed from the first lens and second lens optical axis direction, but not to be overlapped with each other inside the effective diameters.

Moreover, the present invention provides an optical pickup, wherein the surfaces for mounting the first lens and the second lens on the holder are so disposed that one is displaced from the other in the optical axis direction, in the optical pickup.

Furthermore, in the optical pickup, the holder has the mounting surface for the first lens on the light emitting element side, and the mounting surface for the second lens on the object lens side.

Moreover, the present invention provides an optical pickup, further comprising a first guide shaft and a second guide shaft for supporting the holder such that the line connecting between the center of the first guide shaft and the center of the second guide shaft is substantially perpendicular to the line connecting between the center of the first lens and the center of the second lens, and that it passes through between the center of the first lens and the center of the second lens, in the optical pickup.

According to the above-mentioned configurations, the lens actuator of the present invention allows the first lens and the second lens to be positioned in a smallest area so as to realize the miniaturization of the lens actuator. Thereby, a small size optical pickup can be provided. Moreover, by the use of the lens actuator, an optical pickup with little spherical aberration, that is, an optical pickup capable of coping with a high density optical disc can be provided.

DESCRIPTION OF THE PREFERRED EMBODIMENTS

Hereinafter, examples will be explained.

EXAMPLE 1

The example 1 of the present invention will be explained with reference to FIGS. 1 to 3.

Figure 1:
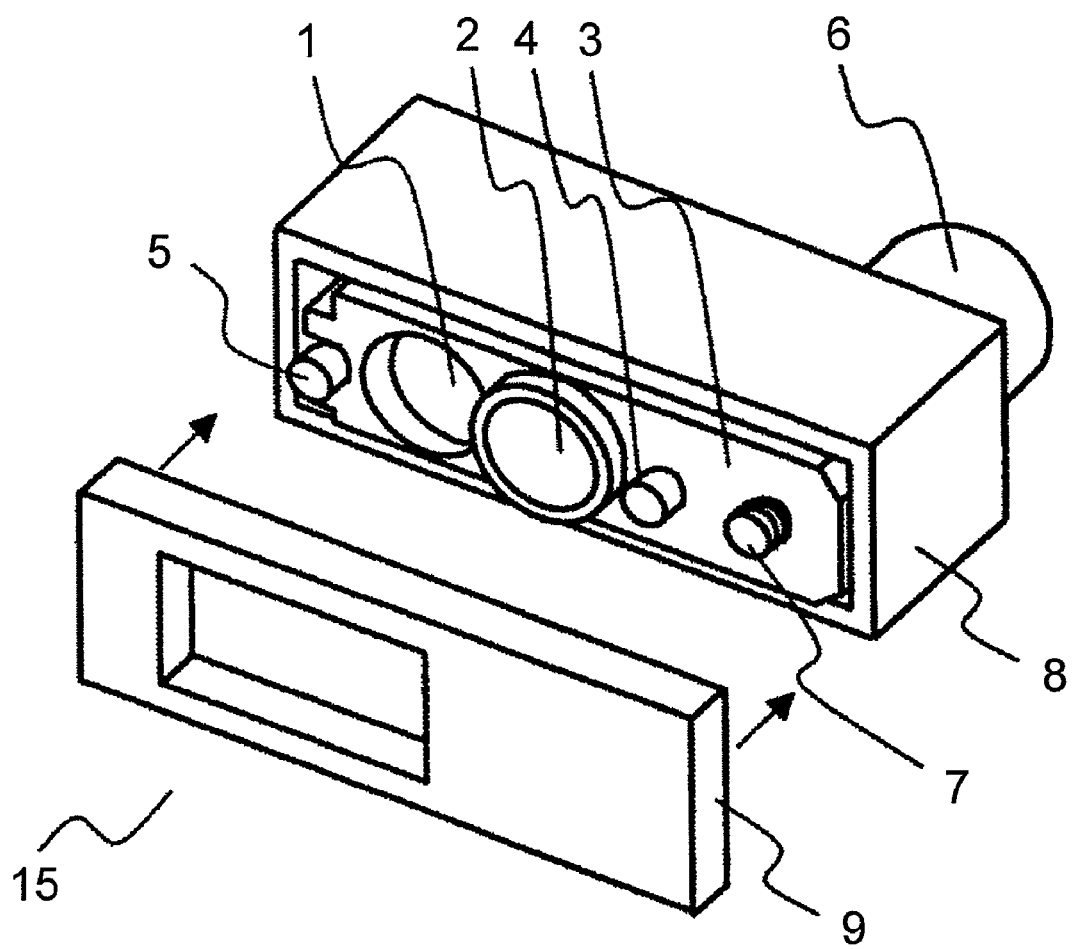
FIG. 1 is a perspective view showing a configuration of a lens actuator of the present invention.
Figure 3:
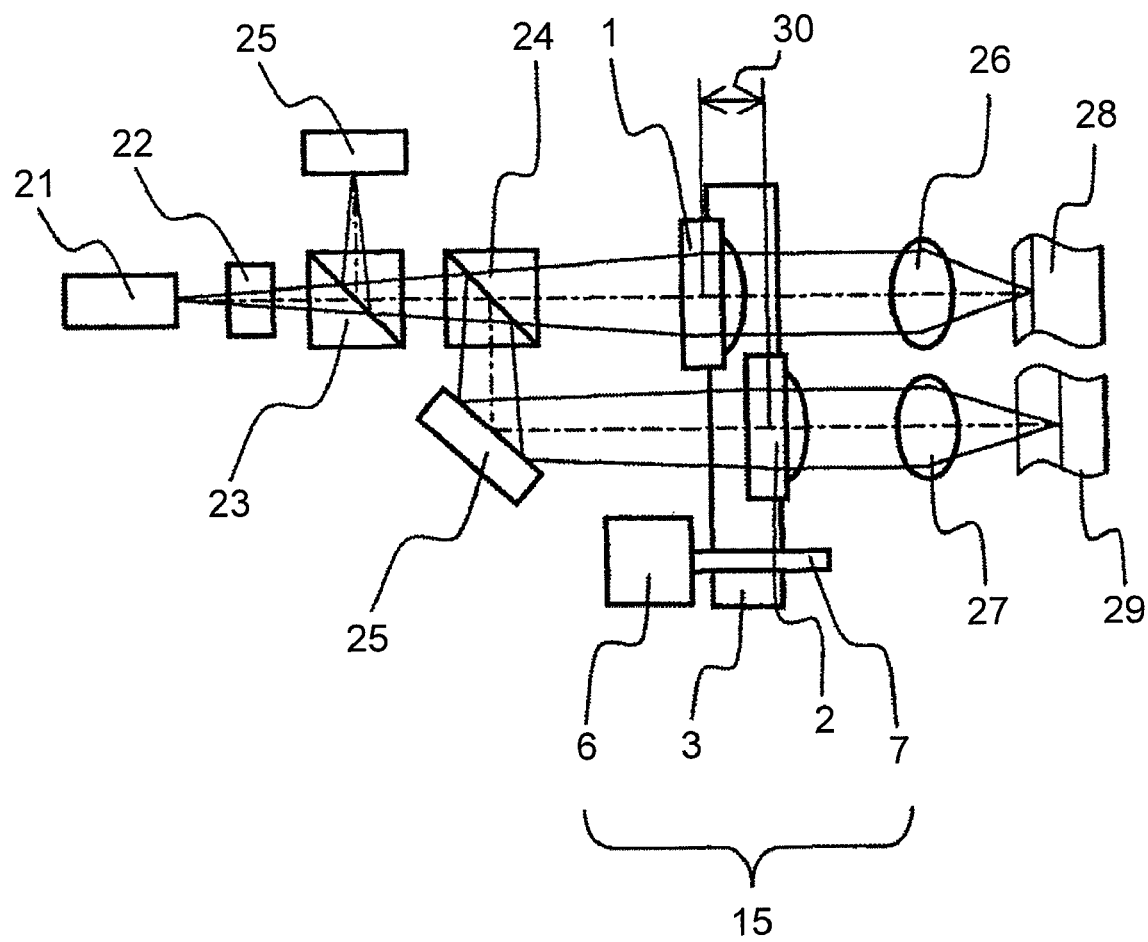
FIG. 3 is a diagram for explaining an optical pickup with a lens actuator of the present invention loaded.
Figure 4:
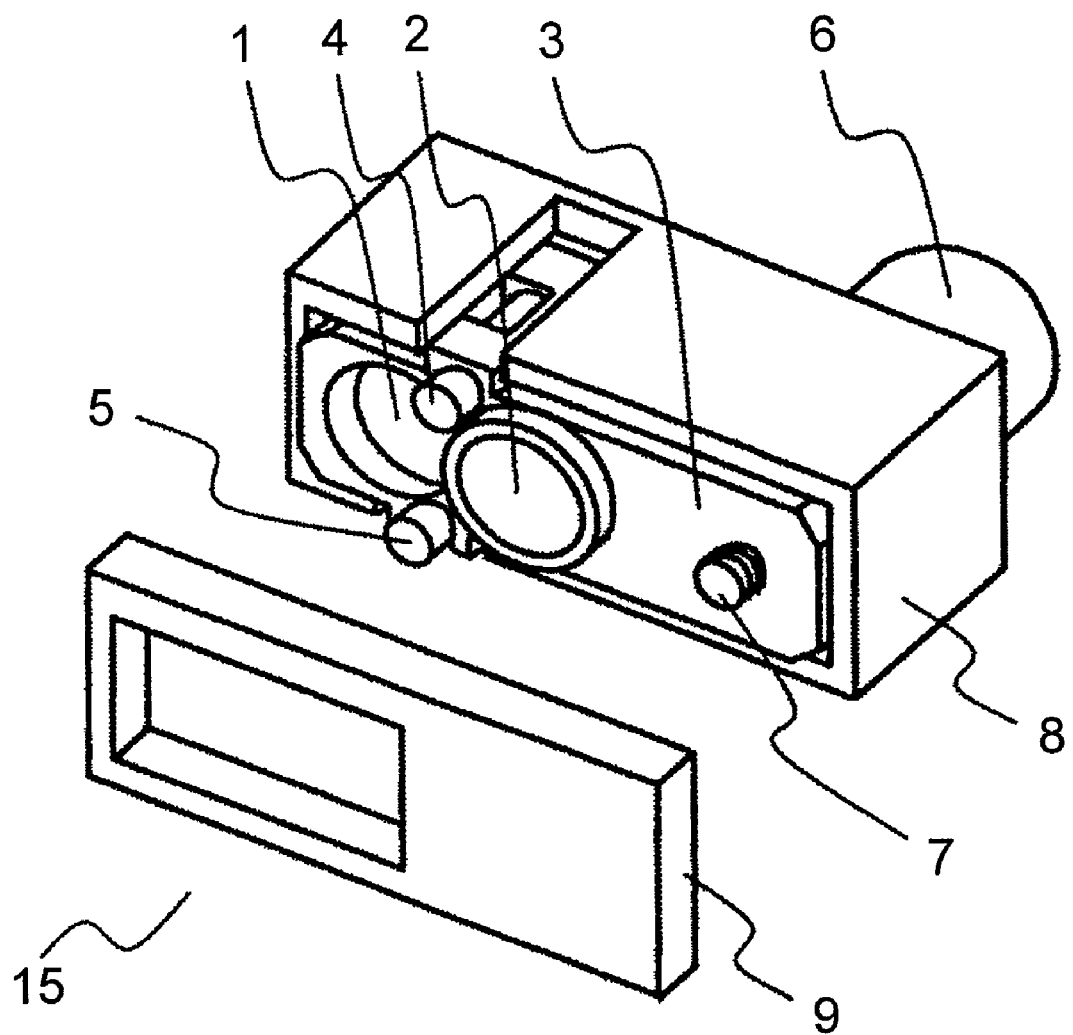
FIG. 4 is a perspective view showing a configuration of a lens actuator of another embodiment of the present invention.

FIG. 1 is a perspective view showing the configuration of a lens actuator of the present invention. FIG. 2 is a diagram for explaining the arrangement of a first lens and a second lens, viewed from the optical axis direction of FIG. 1. FIGS. 3, 4 are diagrams for explaining an optical pickup mounted with a lens actuator.

In FIG. 1, a first lens 1 and a second lens are mounted on a holder 3, with the optical axes of the first lens 1 and second lens 2 substantially parallel to each other. A first guide shaft 4 and a second guide shaft 5 are mounted on a housing 8, and the holder 3 has a structure such that it can be driven in the optical axis direction of the first lens 1 and the second lens 2 (lens focus direction) along the first guide shaft 4 and the second guide shaft 5. A motor 6 mounted on the housing 8 comprises a lead screw 7 so as to provide a mechanism for driving the holder 3 in the optical axis direction according to the rotation of the motor 6. Moreover, a lid 9 provided with a hole to avoid shielding a beam of the first lens 1 and the second lens 2, is mounted on the housing 8. The first lens and second lens mounted on the holder 3 comprise their respective outer periphery parts 11 outside the effective diameter (portion having a lens function) such that the outer periphery parts 11 of the first lens 1 and second lens 2 are disposed to be partially overlapped with each other when viewed from the first lens 1 and second lens 2 optical axis direction. Providing the overlapping portion 10 leads to a small size lens actuator 15. On this occasion, the driving mechanism for the holder 3 may be a linear drive mechanism utilizing a magnetic circuit other than the driving mechanism by a motor, or the like.

Figure 2:
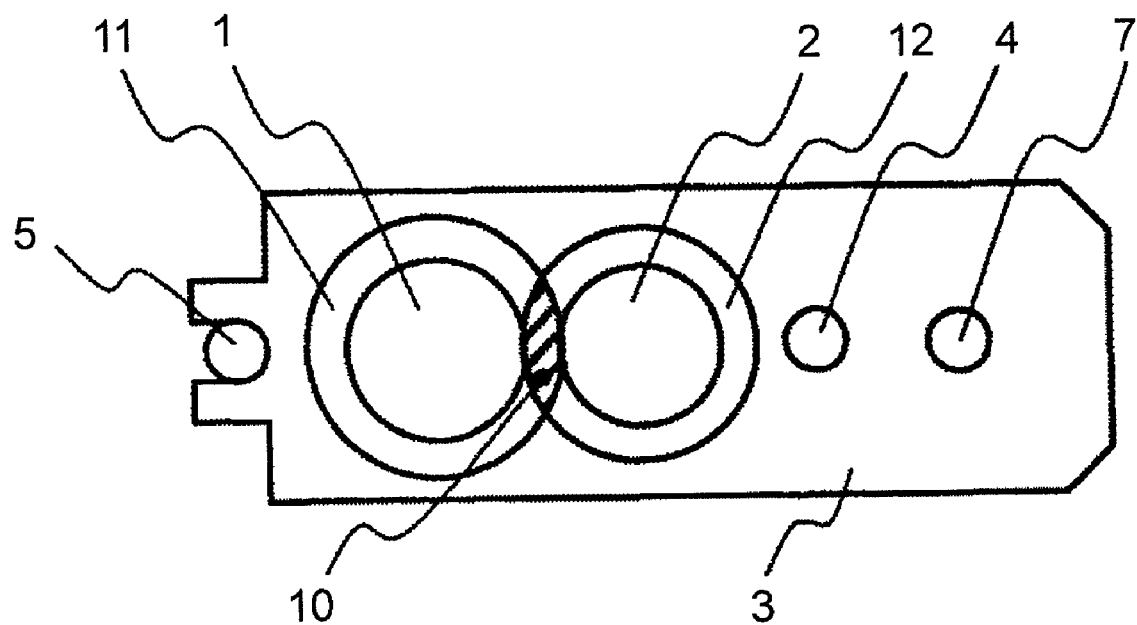
FIG. 2 is a diagram for explaining the arrangement of a first lens and a second lens, viewed from the optical axis direction of FIG. 1.

FIG. 2 is a plan view viewed from the optical axis direction of the first lens 1 and the second lens 2. The first lens 1 is provided with the outer periphery part 11 outside the effective diameter for ensuring the accuracy of the lens surface. Similarly, the second lens 2 is also provided with the outer periphery part 12 outside the effective diameter. Since the outer periphery part 11 of the first lens 1 and the outer periphery part 12 of the second lens 2 are disposed so as to be partially overlapped with each other when viewed from the direction of the optical axes of the first lens 1 and second lens 2 while being provided with the overlapping portion 10, miniaturization of the lens actuator 15 can be achieved.

The optical pickup on which the lens actuator 15 is mounted shown in FIG. 3 will be explained. A light irradiated from a light emitting element 21 such as a laser is incident on a first beam splitter 24 via a polarization switching element 22 so as to be split into a first beam and a second beam. The polarization switching element 22 changes the polarization direction of the light irradiated from the light emitting element 21 according to a first disc 28 and a second disc 29 having a different protective layer thickness, to select the optical paths corresponding to the first disc 28 and the second disc 29. A light transmitted through the beam splitter 24 passes through the first lens 1 and then is focused on the first disc 28 by the first object lens 26. A light reflected by the beam splitter 24 is reflected by the reflection plate 25 to pass through the second lens 2 and then is focused on the second disc 29 by the first object lens 27. Thereafter, the lights return along the same optical paths respectively so as to be collected to the light receiving element 25 via the second beam splitter 24 for recording or replaying the information on the first disc 28 and the second disc 29. With the higher density achieved in the optical disc, due to the increasing influence of both the thickness irregularity of the transparent protective layer and the spherical aberration generated by traveling between the recording layers of the multiple layer recording disc, correction of the spherical aberration using the first lens 1 and the second lens 2 other than the first object lens 26 and the second object lens 27 is needed for obtaining a preferable signal. Since a large space for accommodating the lens outer diameters is needed if the first lens 1 and the second lens 2 are arranged side by side, each of the first lens 1 and second lens 2 has an outer periphery part outside the effective diameter such that the outer periphery part 11 and the outer periphery part 12 of the first lens 1 and second lens 2 are arranged to be partially overlapped with each other when viewed from the optical axis direction of the first lens 1 and second lens 2. Since the overlapping portion 10 is provided, a small size lens actuator 15 can be provided.

The overlapping portion 10 of the first lens 1 and the second lens 2 is a part of the outer periphery of the lens outside the effective diameter, which does not deteriorate the lens functions of the first lens 1 and the second lens 2. The first lens 1 and the second lens 2 mounting surfaces on the holder 3 are so disposed that one of the lens mounting surfaces is displaced from the other in the optical axis direction, with a distance 30 provided between them. By moving the holder 3 on which the first lens 1 and the second lens 2 are mounted in the optical axis direction, by the motor 6, or the like, the spherical aberration is corrected. By the use of the lens actuator 15, miniaturization due to the lens overlapping arrangement can be achieved. Furthermore, since the two lenses corresponding to the discs are mounted on the same lens actuator, the lens driving mechanism of the lens actuator can be provided commonly so as to achieve the cost reduction and the miniaturization of the lens actuator. Therefore, an optical pickup having a preferable signal characteristic without spherical aberration, that is, an optical pickup capable of coping with the high density of the optical disc can be provided.

Such a configuration has been described here that the light irradiated from the light emitting element 21 such as a laser is incident on the first beam splitter 24 via the polarization switching element 22 to be split into the first light and the second light. However, the light emitting elements corresponding to the first disc 28 and the second disc 29 may be disposed independently so as to eliminate the beam splitter 24 from their respective optical axes. Comparing this case with the configuration of FIG. 3, since the light emitting element is expensive, the cost reduction of the optical pickup can be achieved in the configuration of FIG. 3 which splits a light with one light emitting element.

EXAMPLE 2

Figure 5:
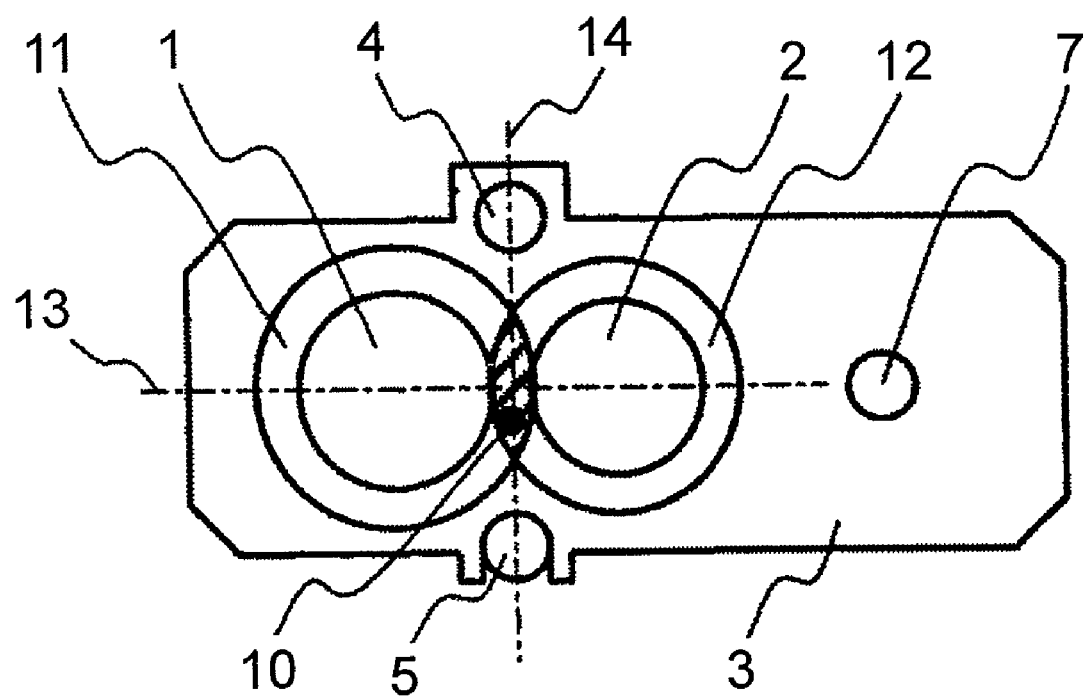
FIG. 5 is a diagram for explaining the arrangement of a first lens and a second lens, and a first guide shaft and a second guide shaft, viewed from the optical axis direction of FIG. 4.

FIG. 4 is a perspective view showing a configuration of a lens actuator of another embodiment of the present invention. FIG. 5 is a diagram for explaining the arrangement of a first lens 1, a second lens 2, and a first guide shaft 4 and a second guide shaft 5, viewed from the optical axis direction of FIG. 4.

In the example 1, the first guide shaft 4 and the second guide shaft 5 of the lens actuator 15 are arranged such that the center of the first guide shaft 4 and the center of the second guide shaft 5 are positioned along a line connecting between the center of the first lens 1 and the center of the second lens 2. In this example, for achieving miniaturization of the lens actuator 15, the first guide shaft 4 and the second guide shaft 5 is arranged such that the line 14 connecting between the center of the first guide shaft 4 and the center of the second guide shaft 5 is substantially perpendicular to the line 13 connecting between the center of the first lens 1 and the center of the second lens 2 and that it is positioned between the center of the first lens 1 and the center of the second lens 2. Thereby, the substantially triangular area where the first lens 1 and the second lens 2 are overlapped can be utilized effectively, in other words, the parts can be integrated in the vicinity of the lens so that miniaturization of the lens actuator 15 can be achieved.

Figure 6:
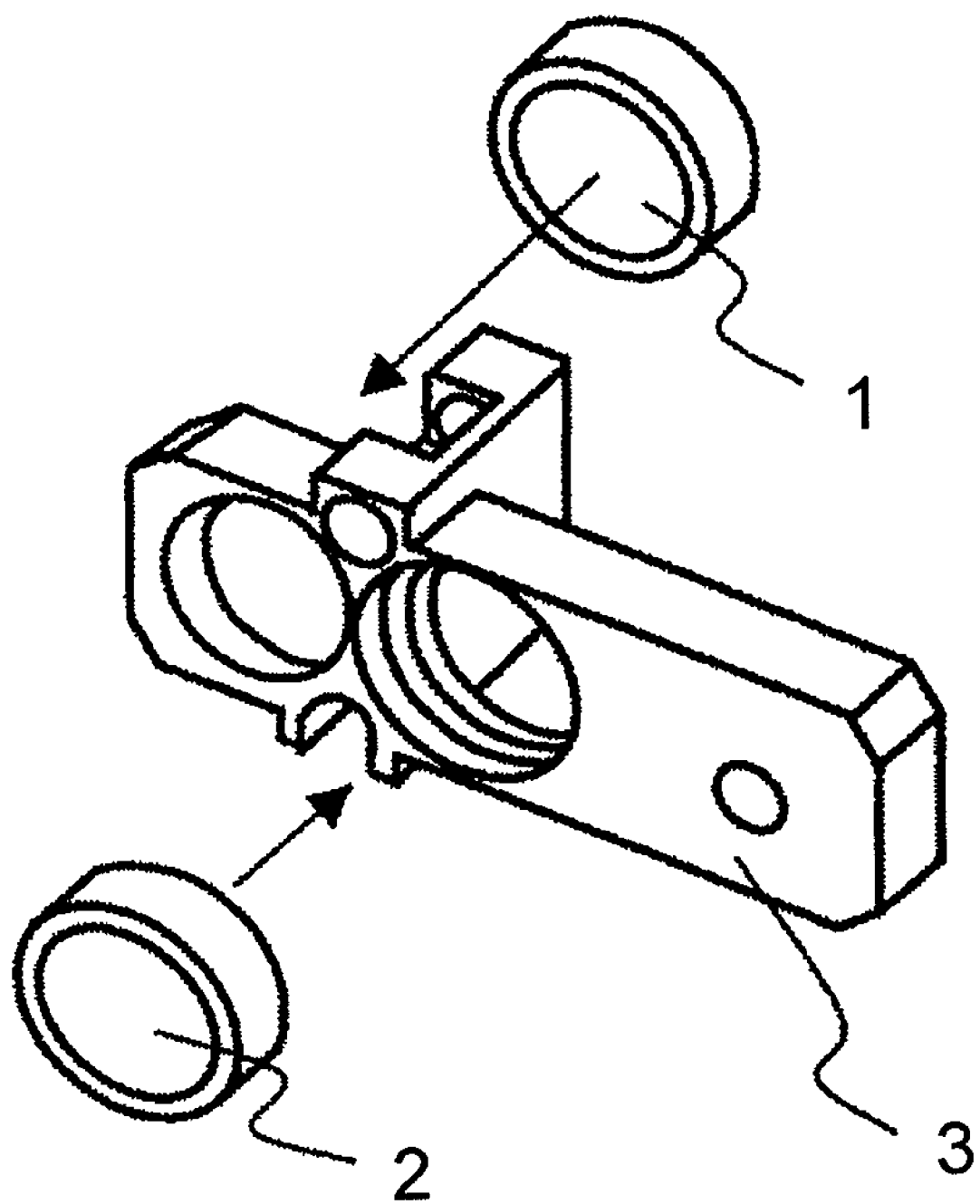
FIG. 6 is a diagram for explaining the method for mounting a first lens and a second lens of the present invention.

The method for mounting the first lens 1 and the second lens 2 of the present invention will be explained with reference to FIG. 6.

Since the first lens 1 and second lens 2 have the outer periphery part 11 and the outer periphery part 12 outside the effective diameter, respectively, such that the outer periphery parts of the first lens 1 and second lens 2 are partially overlapped with each other when viewed from the optical axis direction of the first lens 1 and second lens 2 so as to provide the overlapping portion 10, miniaturization of the lens actuator 15 can be achieved. The mounting surfaces of the holder 3 for the first lens 1 and the second lens 2 are so disposed that one of the surfaces is displaced from the other in the optical axis direction, with a distance 30 provided between them. For providing the distance 30 and mounting the first lens 1 and the second lens 2 on the holder 3 from the same direction, the holder 3 should be eliminated in the overlapping portion 10 of the first lens 1 and the second lens 2, which may deteriorate the stiffness of the holder 3. The deterioration of the holder stiffness leads to the decline of the oscillation characteristics of the lens actuator 15 and the decline of the disc followability. For improving the holder stiffness, the holder 3 has the mounting surface for the first lens 1 on the light emitting element 21 side and the mounting surface for the second lens 2 on the object lens 27 side such that the directions of mounting the first lens 1 and the second lens 2 are opposite to each other in the optical axis direction. At the time, the relationship between the mounting surfaces for the first lens 1 and the second lens 2 may be opposite to the description mentioned above. According to such an arrangement of lens mounting surfaces, the holder 3 can exist also in the lens overlapping portion 10 so as to improve the holder stiffness, so that the small size lens actuator 15 with the preferable oscillation characteristics can be provided, and furthermore, the optical pickup having the preferable signal characteristics and a preferable followability can be provided by the correction of the spherical aberration.

What is claimed is:

1. A lens actuator comprising a first lens and a second lens having different optical paths, disposed between a light emitting element and an object lens, a holder for holding the first lens and the second lens, and a driving mechanism for driving the first lens and the second lens each in the optical axis directions, wherein the first lens and the second lens have outer periphery parts respectively outside the effective diameter, the optical axes of the first lens and the second lens are substantially parallel to each other, and the outer periphery parts of the first lens and the second lens are disposed to be partially overlapped with each other when viewed from the first lens and second lens optical axis direction wherein the surfaces on the holder for mounting the first lens and the second lens are so disposed that one is displaced from the other in the optical axis direction.

2. The lens actuator according to claim 1, wherein the holder has the mounting surface for the first lens on the light emitting element side, and the mounting surface for the second lens on the object lens side.

3. The lens actuator according to claims 1 or 2 further comprising a first guide shaft and a second guide shaft for supporting the holder such that the line connecting between the center of the first guide shaft and the center of the second guide shaft is substantially perpendicular to the line connecting between the center of the first lens and the center of the second lens, and that it passes through between the center of the first lens and the center of the second lens.

4. An optical pickup comprising a light emitting element, first and second object lens, a first lens disposed on a first optical path between the light emitting element and the first object lens, a second lens disposed on a second optical path between the light emitting element and the second object lens, and a lens actuator for moving the first lens and the second lens simultaneously in the optical axis direction, wherein the first lens and the second lens have outer periphery parts respectively outside the effective diameter, the optical axes of the first lens and second lens are substantially parallel to each other, and the outer periphery parts of the first lens and the second lens are disposed to be partially overlapped with each other when viewed from the first lens and second lens optical axis direction and not to be overlapped with each other inside the effective diameters wherein the surfaces on the holder for mounting the first lens and the second lens are so disposed that one is displaced from the other in the optical axis direction.

5. The optical pickup according to claim 4, wherein the holder has the mounting surface for the first lens on the light emitting element side, and the mounting surface for the second lens on the object lens side.

6. The optical pickup according to claims 4 or 5, further comprising a first guide shaft and a second guide shaft for supporting the holder such that the line connecting between the center of the first guide shaft and the center of the second guide shaft is substantially perpendicular to the line connecting between the center of the first lens and the center of the second lens, and that it passes through between the center of the first lens and the center of the second lens.

* * * * *